United States Patent
Fries

(10) Patent No.: US 8,195,958 B2
(45) Date of Patent: Jun. 5, 2012

(54) SECURITY MODULE FOR ENCRYPTING A TELEPHONE CONVERSATION

(75) Inventor: Steffen Fries, Baldham (DE)

(73) Assignee: Siemens Aktiengesellschaft, Munich (DE)

( * ) Notice: Subject to any disclaimer, the term of this patent is extended or adjusted under 35 U.S.C. 154(b) by 586 days.

(21) Appl. No.: 10/580,954

(22) PCT Filed: Nov. 9, 2004

(86) PCT No.: PCT/EP2004/052885
§ 371 (c)(1),
(2), (4) Date: May 30, 2006

(87) PCT Pub. No.: WO2005/053290
PCT Pub. Date: Jun. 9, 2005

(65) Prior Publication Data
US 2007/0121582 A1    May 31, 2007

(30) Foreign Application Priority Data
Nov. 27, 2003 (DE) .................................. 103 55 418

(51) Int. Cl.
*H04L 29/06* (2006.01)
(52) U.S. Cl. .................... 713/192; 713/153; 713/171
(58) Field of Classification Search .................. None
See application file for complete search history.

(56) References Cited

U.S. PATENT DOCUMENTS

| | | | |
|---|---|---|---|
| 5,778,071 A | 7/1998 | Caputo et al. | |
| 6,151,677 A * | 11/2000 | Walter et al. | 713/183 |
| 6,356,638 B1 | 3/2002 | Hardy et al. | |
| 6,584,562 B1 | 6/2003 | Fiori | |
| 6,792,534 B2 * | 9/2004 | Medvinsky | 713/171 |
| 6,856,687 B2 * | 2/2005 | DiSanto et al. | 380/243 |
| 6,857,072 B1 * | 2/2005 | Schuster et al. | 713/160 |
| 6,889,321 B1 * | 5/2005 | Kung et al. | 713/153 |
| 7,035,410 B1 * | 4/2006 | Aiello et al. | 380/247 |
| 7,308,101 B2 * | 12/2007 | Wing | 380/257 |
| 7,366,894 B1 * | 4/2008 | Kalimuthu et al. | 713/153 |
| 7,382,881 B2 * | 6/2008 | Uusitalo et al. | 380/262 |
| 7,426,636 B1 * | 9/2008 | McGrew et al. | 713/160 |
| 2003/0009659 A1 * | 1/2003 | DiSanto et al. | 713/151 |
| 2003/0103506 A1 * | 6/2003 | Keller | 370/392 |
| 2003/0131236 A1 * | 7/2003 | Sasmazel | 713/171 |
| 2003/0137959 A1 * | 7/2003 | Nebiker et al. | 370/338 |
| 2004/0153643 A1 * | 8/2004 | Correll et al. | 713/150 |

(Continued)

FOREIGN PATENT DOCUMENTS
EP    1 328 101    7/2003

OTHER PUBLICATIONS
Ruland et al., "Confidential Multimedia Communication in IP Networks", 2002, IEEE, p. 516-523.*

(Continued)

*Primary Examiner* — Eleni Shiferaw
*Assistant Examiner* — Jeffery Williams
(74) *Attorney, Agent, or Firm* — Staas & Halsey LLP

(57) ABSTRACT

A telephone conversation between one or several first telecommunication terminals in a packet oriented data network and telecommunication terminals in an analog and/or digital network is encrypted by a module which enables the use of protocols from a LAN network to a TDM network to carry out end-to-end encryption.

7 Claims, 1 Drawing Sheet

U.S. PATENT DOCUMENTS

| | | | |
|---|---|---|---|
| 2005/0007955 A1* | 1/2005 | Schrodi | 370/230 |
| 2005/0060543 A1* | 3/2005 | Anspach | 713/165 |
| 2006/0043164 A1* | 3/2006 | Dowling et al. | 235/375 |
| 2008/0189548 A1* | 8/2008 | Steeves et al. | 713/171 |

OTHER PUBLICATIONS

Blom et al., "Conversational IP Multimedia Security", 2002, IEEE, p. 147-151.*

W. P. Lu et al., "Secure Communication in Internet Environments: A Hierarchical Key Management Scheme for End-to-End Encryption"; IEEE Transactions on Communications, vol. 37, No. 10, Oct. 1999; pp. 1014-1023.

A. Dutta et al., "Realizing Mobile Wireless Internet TelephonY and Streaming Multimedia Testbed"; Computer Communications, vol. 27, No. 8, May 2004, pp. 725-738.

H. Wook et al., "Study on Robust Billing Mechanism for SIP-based Internet Telephony Services", Advanced Communication Technology, 6th International Conference, Feb. 2004; vol. 2, No. 9, pp. 756-759.

International Search Report for Application No. PCT/2004/052885; mailed May 11, 2005.

Tanenbaum; Computer Networks; Prentice Hall; London; 1996; pp. 229-232.

Schneier B.; Applied Cryptography Protocols, Algorithms and Source Code in C; John Wiley & Sons; New York; 1996; pp. 216-220.

M. Baugher et al., "The Secure Real-time Transport Protocol (SRTP)", Network Working Group, Request for Comments: 3711, Category: Standards Track, Mar. 2004, Retrieved from www.ietf.org/internet-drafts/draft-ietf-avtz-srtp-09.txt on May 21, 2007, pp. 1-56.

Bruce Schneier, "Applied Cryptography Protocols, Algorithms and Source Code in C", John Wileys and Sons, 1996, New York, pp. 216-220.

J. Arkko et al., "MIKEY: Multimedia Internet KEYing", Internet Engineering Task Force, MSEC Working Group, Internet-Draft, Jun. 2003. Retrieved from ietf.org/internet-drafts/draft-ietf-msec-mikey-07.txt.

* cited by examiner

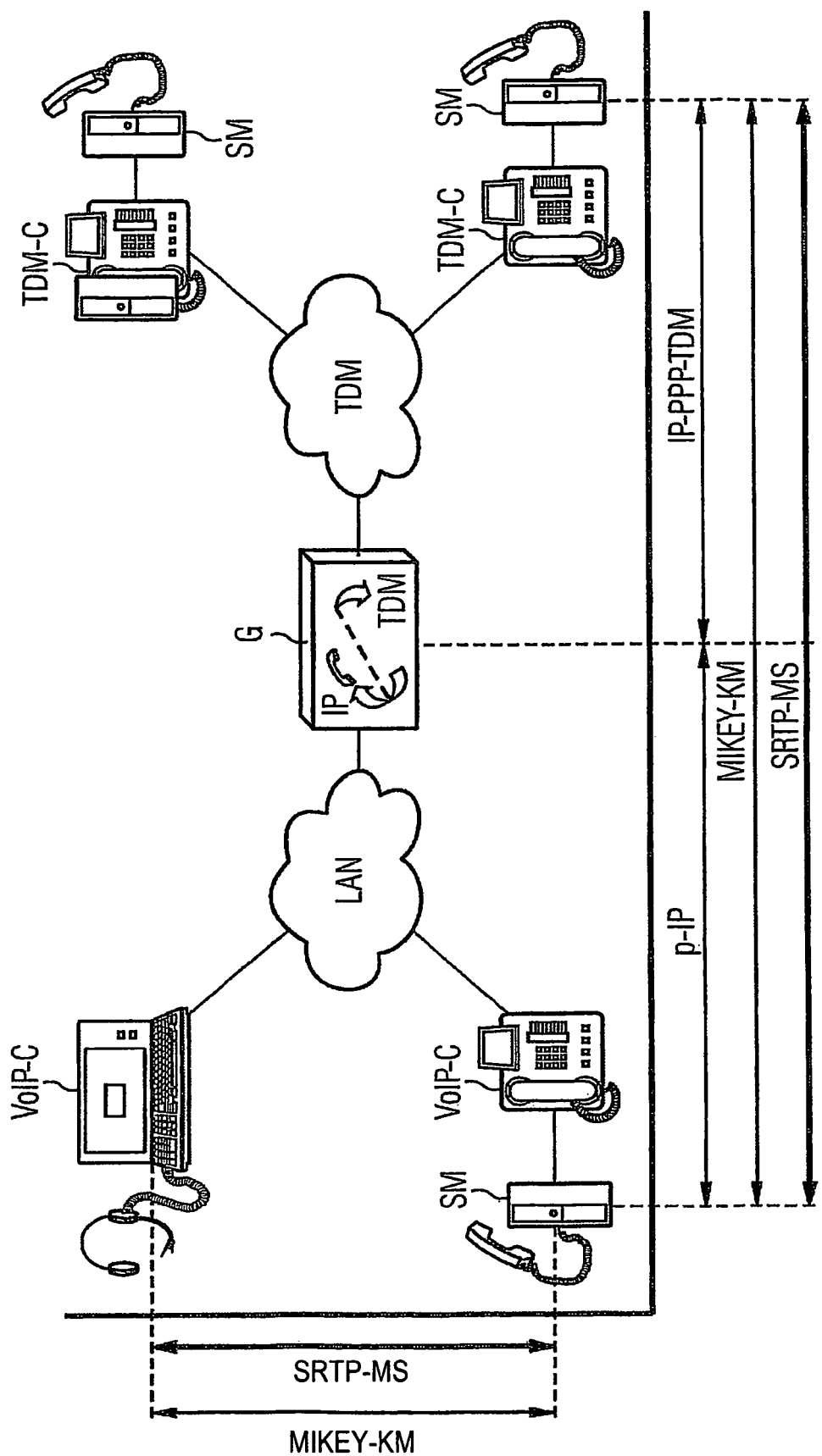

US 8,195,958 B2

SECURITY MODULE FOR ENCRYPTING A TELEPHONE CONVERSATION

CROSS REFERENCE TO RELATED APPLICATIONS

This application is based on and hereby claims priority to German Application No. 10355418.1 filed on Nov. 27, 2003, the contents of which are hereby incorporated by reference.

BACKGROUND OF THE INVENTION

1. Field of the Invention

The invention relates to a security module for encrypting a telephone conversation between one or more first telecommunication terminals in a packet-oriented data network and one or more second telecommunication terminals in an analog and/or digital telephone network.

2. Description of the Related Art

Telephony in IP networks is known from the related art. Standards now exist in which the signaling for telephony in IP-networks is defined. The standards concerned here are the IETF Standard SIP and the ITU Standard H.323, which is also referred to as "Voice over IP" (VoIP) and is mainly employed in LAN or WLAN-based networks (LAN=Local Area Network, WLAN Wireless Local Area Network). With VoIP telephony security aspects have been mainly considered to date in relation to the authenticity and Integrity of control and signaling data. In future solutions, in addition to the pure signaling security, the security of the transferred voice data will also be considered. To secure voice data in IP networks for example the encrypted transport protocol SRTP (where SRTP=Secure Real Time Transport Protocol; see Baugher et al.; The Secure Real-time Transport Protocol; Work in Progress; search.ieff.org/internetdrafts/draft-ieff-avt-srtp-09.txt) comes into consideration.

With the current security solutions however only security of voice data in packet-oriented networks is guaranteed. Although security solutions also exist for telephony in public telephone networks, however there has not been an opportunity thus far for conducting encrypted telephone conversations from a packet-oriented network to a public telephone network.

SUMMARY OF THE INVENTION

An aspect of the invention is therefore to create a security module for encrypting a telephone conversation which enables encryption of the voice data in a heterogeneous network including a packet-oriented data network and a telephone network.

The inventive security module serves to encrypt a telephone conversation between one or more first telecommunication terminals in a packet-oriented data network and one or more second telecommunication terminals in an analog and/or digital telephone network, with data packets being transported using an encrypted transport protocol in the packet-oriented network and the keys for the encrypted transport protocol being exchanged using a key exchange protocol. A telephone network is taken below to be any type of PSTN (PSTN=Public Switched Telephone Network) which means that both an analog and also a digital telephone network can be involved. The packet-oriented network and the telephone network in this case are connected to each other via a gateway computer and the security module can be connected into a connecting line at a first or second telecommunication terminal for a telephone conversation. The term "connecting line" is in this case to be understood in general terms, which means that it can involve a wired and also a wireless connection at the corresponding telecommunication terminal.

The inventive security module includes a protocol processing device which processes messages of the key exchange protocol as well as data packets transported using the encrypted transport protocol, if the security module is connected into a connecting line for a telephone conversation at a first or second telecommunication terminal. The task of the protocol processing device is to convert voice signals which are created at the corresponding telecommunication terminal into data packets for transport via the encrypted transport protocol and to convert incoming data packets at the security module which are transported via the encrypted transport protocol, into voice signals.

The security module further features a modem connection unit which is always used if the security module is connected into a connection line at a second telecommunication terminal. In this case the modem connection unit sets up a modem connection for a telephone conversation between the second telecommunication terminal and the gateway and/or a further second telecommunication terminal, with data packets being transported using the encrypted transport protocol as well as messages of the key exchange protocol over the modem connection. Preferably a PPP connection (PPP=Point-to-Point Protocol) runs over the modem connection with which the data packets of the transport protocol as well as messages of the key exchange protocol are transported. The modem connection unit in the security module thus implements a transfer of encryption technologies from packet-oriented networks into public telephone networks. This is possible since modem connections currently have sufficient bandwidth or transmission rates for transmitting real-time media data packets.

In an especially preferred embodiment SRTP is used as the encrypted transport protocol (see Baugher et al.). The key exchange protocol MIKEY (=Multimedia Internet KEYing) is preferably used for the exchange of the keys which are used in the encrypted transport protocol MIKEY is currently a draft at the IETF which will be declared a standard in the foreseeable future.

In a further embodiment of the security module messages of the key exchange protocol are transported for a telephone conversation via the SIP (SIP=Session Initiation Protocol), with the protocol processing device of the security module being embodied such that it can process this protocol.

The telephone network in which the inventive security module is used is for example a digital ISDN network. Preferably the modem connection unit in this case sets up a modem connection via the B channel in the ISDN network. The packet-oriented network involved is preferably an IP-based data network, especially a LAN network. The modem connection unit preferably establishes a modem connection in accordance with the V90 and/or V92 standard, with this standard providing a sufficient bandwidth or transmission rates for transmitting data packets from packet-oriented networks.

In a variant of the invention the security module is used for telephones with a connecting cable between telephone and telephone handset, with the security module being embodied such that it can be connected into the connecting cable.

BRIEF DESCRIPTION OF THE DRAWINGS

These and other objects and advantages of the present invention will become more apparent and more readily appreciated from the following description of the preferred embodiments, taken in conjunction with the accompanying drawing of FIG. 1, a schematic diagram of a heterogeneous network in which the inventive security module for encryption of voice signals is used.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

The heterogeneous network shown in FIG. 1 on the one hand includes an IP-based LAN (LAN=Local Area Network) as well as a public TDM (TDM=Time Division Multiplexing) telephone network. The TDM network is a digital network, with a special analog speech channel being used however for transmission of spoken words. The LAN and the TDM network are connected to each other via a gateway G. The gateway is used to modify IP data packets transmitted in the LAN network for forwarding in the TDM network as well as data from the TDM network for forwarding in the LAN network in the appropriate manner.

There are two VoIP clients VoIP-C in the LAN network which make telephony via packet-oriented networks possible. The SIP or H.323 standards sufficiently well-known to the person skilled in the art can be used when telephoning via "Voice over IP". The lower VoIP client in FIG. 1 is a telephone with which the intention is to set up an encrypted telephone call. Therefore the inventive security module is connected between the handset of the telephone and the actual telephone in the corresponding connecting line.

In the TDM network of FIG. 1 for example two TDM clients, TDM-C, in the form of telephones are shown, with which encrypted telephone conversations can also be conducted. Therefore in these telephones too the inventive security module SM is also connected in the connecting line between the handsets and the actual telephone.

The security modules known from the related art allow an encryption of the telephone call only within the TDM network, in which case each telephone caller, to set up an encrypted telephone call, creates a key in each case by pressing a button on his security module, with the keys then being exchanged via a proprietary signaling protocol between the telephones of the participants. Finally combinations of numbers are shown on the displays which are integrated into the security modules which the callers exchange with each other over the telephone connection If the combinations of numbers match it can be assumed that the call is not being overheard by any third party so that with the aid of the exchanged keys encrypted data transmissions is finally undertaken, with a proprietary protocol again being used here. Experiments have shown that with known security modules no encrypted telephone conversations between a telephone in a packet-oriented network and a telephone in a TDM network can be conducted. The result is thus that in packet-oriented networks the data is transmitted asynchronously, which can lead to bandwidth variations (also known as jitter) which cannot be processed by known security modules. Likewise data packet losses arising in packet-oriented networks lead to problems with known security modules.

The security module in accordance with the embodiment described here solves this problem by being able to process the protocols known from the IP world for encrypting data in a normal public TDM network. To this end a protocol processing device is provided in the security module which can process the encrypted transport protocol SRTP (SRTP=Secure Real Time Protocol). This protocol is likely to become the future standard for encrypted transmission of media data. In addition the protocol processing device can process the key exchange protocol MIKEY. Keys are created with this protocol and exchanged between the clients or telephones in the heterogeneous network of FIG. 1. The keys in this case are used by the transport protocol SRTP for encrypted transmission of the data packets by SRTE. The protocol processing device enables facilities such as encrypted telephony between VoIP clients in the LAN network. This is shown in FIG. 1 by the double arrows MIKEY-KM (KM stands for KEY Management) and SRTP-MS (MS stands for Media Security).

To set up an encrypted telephone call between subscribers in the TDM network or between a subscriber in the LAN network and a subscriber in the TDM network, the security module SM features a modem connection unit. This modem connection unit establishes a modem connection for a telephone conversation of a subscriber in the TDM network to a subscriber in the LAN network via a voice channel in the TDM network to the gateway G. Preferably this involves a V92 modem connection which can transmit the data at 56 kbit/s downstream and 48 kbit/s upstream. Via this connection a further connection is made available via the PPP (PPP=Point to Point Protocol), with data being transported via the latter in the key exchange protocol MIKEY or in the SRTP protocol. Since these protocols can be processed by the protocol processing device in the security module SM a migration of the protocols from the LAN network into the TDM network is thus made possible.

The MIKEY messages are transported in the LAN network for example via the SIP protocol. In the gateway the contents of the MIKEY messages can then be cut out of the SIP message and inserted into the PPP tunnel. It would however also be conceivable for the gateway to simply send the SIP messages onwards in the PPP tunnel, without cutting out the MIKEY messages. In such a case the protocol processing unit of the security module must be able to process the SIP protocol. Thus a solution is also conceivable in which the security module SM functions as an SIP end point. In relation to the data which is transported via the SRTP protocol, the gateway G only assumes a forwarding function and does not modify the data. This also applies to the actual key exchange data in the form of MIKEY messages. Where necessary the gateway can however also be included as a trustworthy component in the connection, in order to allow. "lawful interception" for example.

The arrows in the lower part of FIG. 1 again illustrate the inventive mechanism. The double arrow labeled p-IP (p-IP=plain IP) highlights the fact that a purely IP-based encrypted data transmission is used between a VoIP-Client VoIP-C and the gateway G. By contrast a modem connection is used between the gateway G and a TDM client TDM-C for encrypted data transport via which the PPP protocol runs, with which IP data packets are again transported. This is indicated by the double arrow IP-PPP-TDM. Despite these different connection mechanisms, an end-to end encryption between a client in the LAN network and a client in the TDM network using the key exchange protocol MIKEY and of the SRTP transport protocol SRTP is obtained. This is highlighted by the double arrows labeled MIKEY-KM and SRTP-MS.

The transmission of encryption protocols known from the IP world in a public telephone network is thus made possible in a simple manner with the inventive security module. This is guaranteed by a modem connection which, as a result of the bandwidths or transmission rates now possible with such a connection, makes possible the transport of real time data packets and signaling messages from the IP world.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

The invention claimed is:

1. A security module for encrypting a telephone conversation between at least one first telecommunication terminal using a Voice over IP (VoIP) system in a packet-oriented data network, and at least one second telecommunication terminal in a public switched telephone network that is distinct from the packet-oriented data network and that is at least one of analog and digital and is connected to the packet-oriented network via a gateway, said security module being connected into a connecting line of one of the first and second telecommunication terminals and comprising:
   a protocol processing unit processing data packets transported on the packet-oriented network using the encrypted transport protocol with keys for the encrypted transport protocol exchanged using a key exchange protocol, converting voice signals, created by the one of the first and second telecommunication terminals at which said security module is connected, into data packets for transport via the encrypted transport protocol and converting data packets, arriving at said security module after transport via the encrypted transport protocol, into voice signals;
   a modem connection unit, used when said security module is connected in a connecting line at a second telecommunication terminal, setting up a modem connection between the second telecommunication terminal and at least one of a gateway and another second telecommunication terminal, with the data packets being transported using the encrypted transport protocol, along with messages of the key exchange protocol, via the modem connection, wherein
   a point-to-point protocol connection is used over the modem connection in transporting the data packets using the encrypted transport protocol, as well as messages of the key exchange protocol, and
   the encrypted transport protocol is Secure Real Time Transport Protocol.

2. A security module in accordance with claim 1, wherein the key exchange protocol is multimedia Internet keying.

3. A security module in accordance with claim 1, wherein for a telephone conversation, messages of the key exchange protocol are transported via a session initiation protocol, and
   wherein said protocol processing unit processes the session initiation protocol.

4. A security module in accordance with claim 1, wherein the telephone network is an ISDN network, and said modem connection unit sets up the modem connection over a B-channel in the ISDN network.

5. A security module in accordance with claim 1, wherein the packet-oriented network is an Internet protocol-based data network and a local area network, and said modem connection unit sets up the modem connection in accordance with at least one of a V90 and a V92 standard.

6. A security module in accordance with claim 5, wherein said security module is connected into a connecting cable between a telephone handset and the one of the first and second telecommunication terminals.

7. A method performed by a security module for encrypting a telephone conversation between at least one first telecommunication terminal using a Voice over IP (VoIP) system in a packet-oriented data network and at least one second telecommunication terminal in a public switched telephone network that is distinct from the packet-oriented data network and that is at least one of analog and digital and is connected to the packet-oriented network via a gateway, said security module being connected into a connecting line of one of the first and second telecommunication terminals and comprising:
   processing data packets transported on the packet-oriented network using the encrypted transport protocol with keys for the encrypted transport protocol exchanged using a key exchange protocol, converting voice signals, created by the one of the first and second telecommunication terminals at which said security module is connected, into data packets for transport via the encrypted transport protocol and converting data packets, arriving at said security module after transport via the encrypted transport protocol, into voice signals;
   when said security module is connected in a connecting line at a second telecommunication terminal, setting up a modem connection between the second telecommunication terminal and at least one of the gateway and another second telecommunication terminal, with the data packets being transported using the encrypted transport protocol, along with messages of the key exchange protocol, via the modem connection; and
   using a point-to-point protocol connection over the modem connection in transporting the data packets using the encrypted transport protocol, as well as messages of the key exchange protocol, wherein
   the encrypted transport protocol is Secure Real Time Transport Protocol.

\* \* \* \* \*